(No Model.)

A. P. NEIBLE.
LOCKING WASHER FOR JAM NUTS.

No. 297,154. Patented Apr. 22, 1884.

WITNESSES.
Chas. N. Leonard,
E. W. Bradford.

INVENTOR.
Augustus P. Neible,
PER
C. Bradford,
ATTORNEY.

UNITED STATES PATENT OFFICE

AUGUSTUS P. NEIBLE, OF EDINBURG, INDIANA, ASSIGNOR OF ONE-HALF TO CHARLES W. NEIBLE, OF SAME PLACE.

LOCKING-WASHER FOR JAM-NUTS.

SPECIFICATION forming part of Letters Patent No. 297,154, dated April 22, 1884.

Application filed January 9, 1884. (No model.)

*To all whom it may concern:*

Be it known that I, AUGUSTUS P. NEIBLE, of the town of Edinburg, county of Johnson, and State of Indiana, have invented certain new and useful Improvements in Locking-Washers for Jam-Nuts, of which the following is a specification.

My said invention consists in combining with the ordinary nut of a bolt and the jam-nut a washer interposed between them, and provided with devices for holding said nuts from turning independently of each other when screwed into place.

Figure 1:
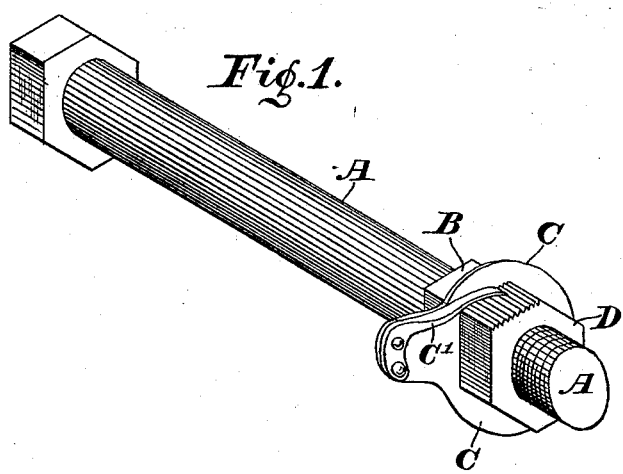
Figure 2:
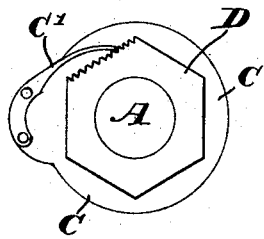
Figure 3:
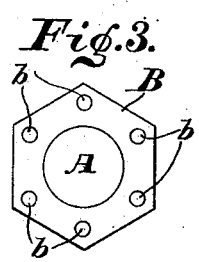
Figure 4:
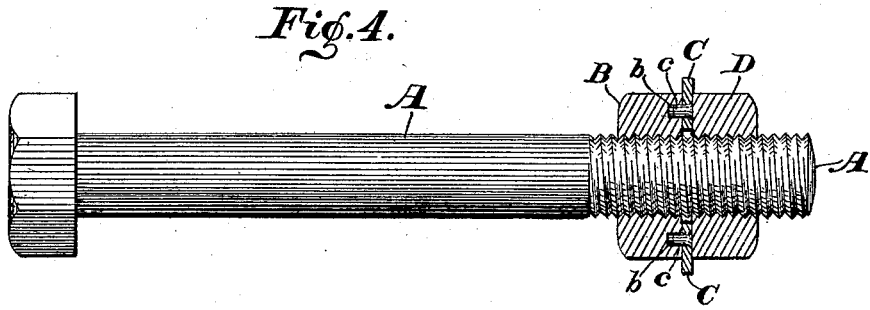

Referring to the accompanying drawings, which are made a part hereof, and on which similar letters of reference indicate similar parts, Figure 1 is a perspective view of a bolt, nuts, and washer embodying my invention; Fig. 2, an end elevation of the same; Fig. 3, an end elevation with the jam-nut and washer removed; and Fig. 4, a longitudinal section through the nuts and washer, showing the bolt in elevation.

In said drawings, the portions marked A represent the bolt, B the ordinary nut, C the washer, and D the jam-nut.

The bolt A is any bolt on which it is desired to use a jam-nut. As it can possess no peculiarities, so far as this invention is concerned, it will not be further described.

The nut B is an ordinary nut, except that it has a hole or series of holes, *b*, into which pins on the washer are adapted to enter.

The washer C is to be placed on the bolt over the nut B, and is provided with studs or pins *c* on its under face, which enter and engage with the holes *b* in said nut. It is also provided on its upper or outer face with the pawl or detent C', which is adapted to engage with the jam-nut. That this pawl may be of proper length, an enlargement, *c'*, is preferably formed on the washer, as shown. Said pawl is preferably formed of spring-steel, and so adjusted as to bear tightly against the sides of the nut D at all times, except when forcibly held therefrom. The nut D is the usual jam-nut, except that it is provided upon one or more of its sides with notches or serrations, with which the end of the pawl C' may engage, as shown. After this nut is turned up tightly, the engagement between this pawl and these serrations will prevent said nut from starting to back off. As the washer is also securely engaged with the nut B, and, as is well known, where jam-nuts are used, the jam-nut must be started first before the other can be moved, the result is, that the nuts are securely locked in position until the pawl is disengaged and the jam-nut started back.

In further explanation of my invention I will say that in practice there is no need of locking the first nut where a jam-nut is used. If the jam-nut can be held from starting, that is all that is required. The friction consequent upon the strain in opposite directions on the thread of the bolt prevents the two nuts from turning conjointly.

When, for appearance' sake or other reason, it is desired that the nuts should present a uniform appearance when tightened up, this result may be secured by having the nuts of uniform size and the washer the thickness of one of the threads of the bolt. The holes *b* being usually in every corner of the nut B, the washer can be adjusted to bring the pawl C' to the proper point to engage with the serrated side of the nut D, when, as is usually the case, but one side of said nut is serrated.

Having thus fully described my said invention, what I claim as new, and desire to secure by Letters Patent, is—

1. The combination of a bolt having only a single style of thread, an ordinary nut, a jam-nut, and a washer interposed between said nuts, and provided with engaging devices which engage with said nuts by reason of their own formation, whereby when said nuts are turned up they are secured against independent movement.

2. The combination of the bolt, the nut therefor provided with holes, a washer provided on one side with studs or pins adapted to enter said holes, and on the other with a pawl, and a jam-nut adapted to engage with and be held in position by said pawl.

3. The combination, with the nut and jam-nut of a bolt, of a washer adapted to engage with and be held by said nut, and a pawl adapted to engage with and hold said jam-nut, said jam-nut being serrated upon one or more sides for this purpose, substantially as set forth.

In witness whereof I have hereunto set my hand and seal, at Indianapolis, Indiana, this 4th day of January, A. D. 1884.

AUGUSTUS P. NEIBLE. [L. S.]

In presence of—
 C. BRADFORD,
 CHAS. L. THURBER.